United States Patent

[11] 3,603,615

[72] Inventor John L. Stehouwer
425 Russwood Street N. E., Grand Rapids, Mich. 49505
[21] Appl. No. 860,569
[22] Filed Sept. 24, 1969
[45] Patented Sept. 7, 1971

[54] VEHICLE SAFETY BELT DEVICE
2 Claims, 4 Drawing Figs.
[52] U.S. Cl. .................................................. 280/150 SB
[51] Int. Cl. .................................................. B60r 21/10
[50] Field of Search .......................................... 280/150
SB; 180/82; 297/388, 389

[56] References Cited
UNITED STATES PATENTS
2,670,967  3/1954  Kean .......................... 280/150
2,855,028  10/1958  Matthews ...................... 280/150
2,855,215  10/1958  Sheren ......................... 280/150
2,880,788  4/1959  Phillips et al. ................. 280/150
2,896,284  7/1959  Bishaf ......................... 280/150
3,351,382  11/1967  Davies ........................ 280/150

Primary Examiner—Leo Friaglia
Assistant Examiner—Robert R. Song
Attorney—Price, Heneveld, Huizenga & Cooper ABSTRACT: An improved safety belt device utilizing a belt looped around a bar welded or otherwise affixed to the vehicle door within the same, positioned at the rear of the door immediately below the windowledge. The looped portion of the belt comes back upon itself where it is secured by stitching. The free end of the belt mates with a seat belt to retain a passenger.

PATENTED SEP 7 1971

3,603,615

INVENTOR
JOHN L. STEHOUWER

BY
Price, Heneveld, Huizenga & Cooper
ATTORNEYS

3,603,615

VEHICLE SAFETY BELT DEVICE

BACKGROUND OF THE INVENTION

In vehicles such as automobiles, conventional safety belt devices for securing passengers therein generally comprise a seat belt and a shoulder belt each of which has two mating parts. Such an arrangement has been found relatively effective in restraining a passenger during impact because the restraining force is applied at spaced vertical areas on the occupant's upper body. Such an arrangement, however, is extremely cumbersome in view of the large number of belts which must be fastened and secured to the frame of the car and in view of the storage problem encountered when the belts are not in use. These belts have the additional disadvantages of not retaining closed in any way the door adjacent to the person so belted in, and in many cases functioning only if drawn up so tightly the they are uncomfortable.

There have been attempts to provide a safety belt which holds the door closed at the same time as it secures the driver or passenger. An example of this is the device disclosed in the U.S. Pat. No. 3,198,544, to P. Presunka wherein the safety belt is mounted to the rear of a door by plate 12d riveted to the same. Still another U.S. Pat. No. 2,848,250 to G. Sheren discloses a seat belt which retains the door closed by the means of riveting of the belt to the bottom rear surface of the door. In neither of said patent structures, however, is there any combined shoulder belt-seat belt function supplied by the belt utilized.

An additional disadvantage of the previous door-mounted belts such as those described above is that their anchorage to the door is so insubstantial as to raise doubts as to their ability to withstand the force of an impact.

SUMMARY OF THE INVENTION

One aspect of this invention relates to the improvement of a safety belt device mounted to a vehicle having a seat for an occupant, a generally hollow door adjacent said seat having interior and exterior panels and a structural connecting surface along the edges thereof, said door being mounted in a frame through which access may be gained to said vehicle when said door is opened, a window in the upper section of said door, and a first safety belt section secured to the frame of said vehicle and passing upwardly onto said seat at a location spaced from the end of said seat and said door; the improvement comprising a second safety belt section having a first extremity adapted for locking engagement with the free extremity of said first safety belt section, and a second extremity fixedly secured to said door at a point on said door adjacent the lower boundary of said window and the connecting surface between said panels such that when said sections are locked together, they will pass around a person seated in said seat in generally diagonal fashion. Another aspect of the invention concerns an improved safety belt device mounted to a hollow vehicle door in a vehicle frame, the door having a window, a window ledge, and a rear surface, the device including a first belt designed to mate with a second belt; the improvement comprising means for fixedly mounting one end of the first belt within the door, the first belt being looped around the mounting means and secured to itself so as to be permanently secured to the mounting means.

Accordingly, it is an object of the invention to provide a safety belt device mounted to a vehicle door which is securely anchored thereto so as to belt in passengers under all conditions.

It is another object of the invention to provide a safety device of the above character wherein one belt forms the functions of both a shoulder belt and a seat belt.

It is a related object of the invention to provide a safety belt of the above character wherein when in use the door is prevented from accidentally opening and yet can still be opened enough to release the belt in order to rescue an injured passenger.

It is a further object of the invention to provide a safety device of the above character which because of its simplicity is inexpensive to manufacture and assemble.

Still another object is to provide a safety device of the above character which is comfortable to wear.

Other objects and advantages will become apparent upon reference to the following drawings and detailed discussion.

DESCRIPTION OF THE PREFERRED EMBODIMENT

Figure 1:
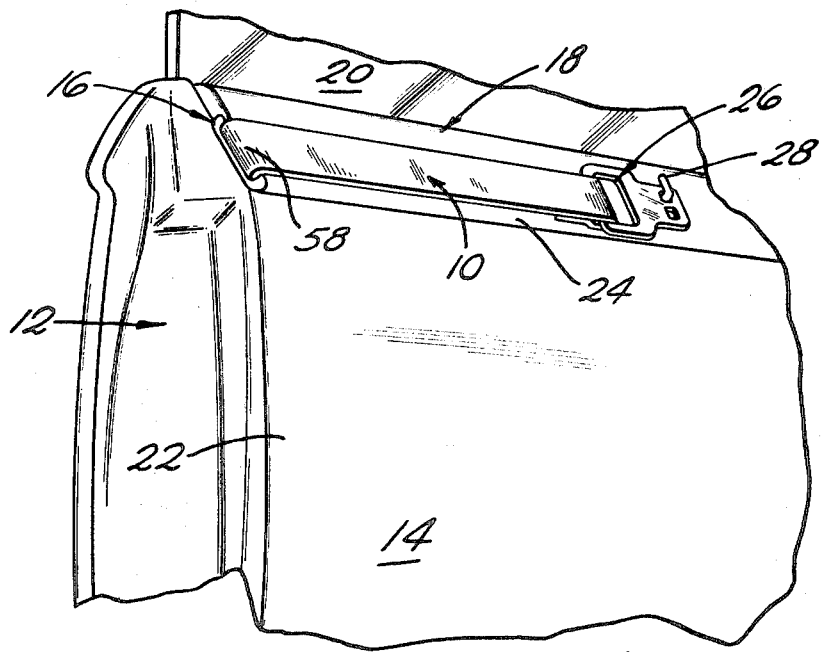
FIG. 1 is a fragmentary perspective view of a safety belt device constructed in accordance with the invention.
Figure 3:
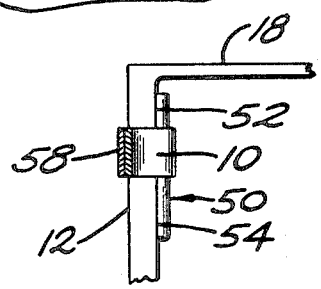
FIG. 3 is a fragmentary sectional view taken along lines III—III of FIG. 2.
Figure 2:
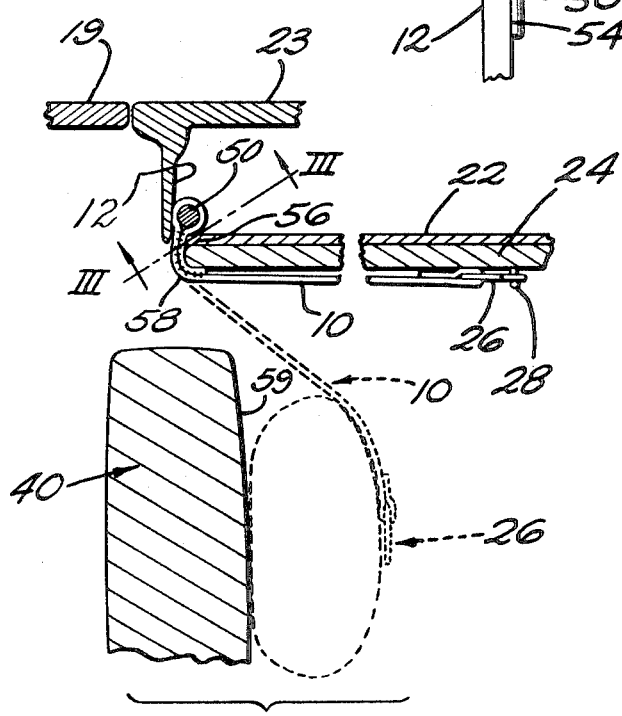
FIG. 2 is a fragmentary partially schematic, partially sectional view showing the relationship of the safety belt device with respect to the passenger.
Figure 4:
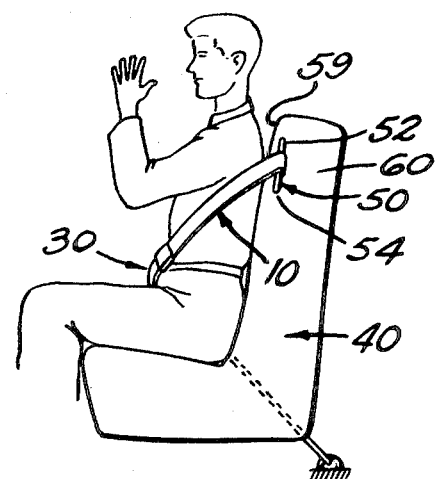
FIG. 4 is a fragmentary partially schematic elevational view illustrating the safety belt device as utilized by a passenger, the door having been omitted for clarity.

The invention concerns an improved door-mounted safety belt device which performs the dual function of a shoulder belt and a seat belt. Specifically, as shown in FIG. 1, a safety belt 10 is mounted at the rear panel 12 of a door 14 at a point 16 immediately below the window ledge 18 which defines the lower boundary of a conventional window 20. The door can be any hollow vehicle door mounted in the vehicle frame 19, and is illustrated in FIG. 1 as preferably an automobile door having the window 20 which is raised and lowered within the door. The door 14 includes an interior panel 22 and an exterior panel 23 jointed to the rear panel 12 which connects the panels, and conventional upholstery sections 24 are removably mounted on the interior panel 22 (FIG. 2). The safety belt 10 is a conventional belt which, as depicted, has at one end a male end 26 for cooperation with a center seat belt 30 having a female buckle end, the center seat belt 30 being conventionally attached to the frame and passing upwardly onto the driver's seat (FIG. 4). To retain the belt 10 out of the way when not in use, the upholstery section 24 has a hook 28 thereon for retaining the male end 26 and the belt 10 flush against the section 24.

It will be readily apparent that the mounting of the safety belt 10 high upon the door immediately below the window ledge 18 allows the belt to serve the function of a shoulder belt by confining and restraining the upper torso as well as the waist of the body. As shown in FIG. 4, the belt passes about 1 inch under the armpit of an adult 6 feet tall when the seat is in the average driving position, and down toward the waist where the buckle of the center seat belt 30 joins it. This arrangement of the belt allows the belt to function without being tightly cinched, thus overcoming the uncomfortable nature of conventional seat and shoulder belts. In the event the passenger is a child, the safety belt 10 may still pass under the armpit. For younger children, the belt may be loosened to allow the belt to be so used, the belt still providing the safety features disclosed above. Because of the placement of the belt below the arm, the belt will not choke a child as would a simple shoulder belt.

The mounting of the safety belt at the rear panel 12 of the door provides a safety feature as will be apparent in FIG. 2, wherein the door 14 may be opened just enough to slip in an arm so as to release the buckle 30 in the event the vehicle has been involved in an accident and the passenger is incapable of releasing himself. This is accomplished by means of the fact that the attachment of the belt 10 to the rear surface of the door 12 positions that mounting of the belt generally in line with the seat 40 holding the passenger, thus giving a little play in the belt in the event the door is pivoted open a few degrees. Also, the manner in which the passenger wears the belt provides some play. However, the amount of play is insufficient to allow the door to be completely opened so that a passenger could fall out. When the door is returned the belt remains tight. The limited play also prevents intruders from gaining access to the occupants of the vehicle.

In accordance with the invention, to securely anchor the safety belt 10 within the door, a vertical bar 50 is welded at its ends 52 and 54 to the interior surface of the connecting panel 12. For the seat adjusted to accommodate a 6-foot adult, this anchor point lines up with the front 59 of the seat back 60 in a compact-sized car, and about 5 to 6 inches in back of the front 59 of the seat back in a very large car. The belt 10 passes into the interior of the door through a notch or opening 56, the belt being looped around the vertical bar 50 and back upon itself where it is stitched as at 58. Thus, the anchoring bar 50 is in effect part of the door panel 12, so that it becomes practically impossible to pull the bar 50 away from its anchoring. That is, much of the pull developed by the belt 10 is absorbed by the rear panel 12. Because the rear panel 12 is adjacent to the post of the vehicle frame 19, the pressure of the passenger is also transferred to the post so as to prevent unanchoring of the belt in case of an impact. Even if the bar 50 should be broken loose, it is still confined within the interior of the door, thus insuring that the belt 10 stays secure to the passenger and that the door stays generally closed.

Although the above description sets forth a particular embodiment, it will be readily apparent that various modifications can be made which are the equivalent. For example, the bar 50 could be made part of the original door structure when the door is manufactured, rather than being welded later to the door. Also, the belt 10 could have the female buckle 30 attached to its free end rather than the male end 26. In that event, a different shaped hook 28 would be utilized so as to hold the buckle against the upholstered section 24. It will also be appreciated that the above described invention can be utilized for any door of the vehicle to secure either a passenger or the driver.

I claim:

1. In a vehicle having a seat for an occupant; a generally hollow door adjacent said seat having spaced interior and exterior panels and a structural connecting panel secured along the rear edges thereof, said door being hingedly mounted in a frame through which access may be gained to said vehicle when said door is opened, said frame including a generally upright member against which said connecting panel abuts when said door is closed; a window opening in the upper section of said door; and a first safety belt section secured to the frame of said vehicle and passing upwardly onto said seat at a location spaced from the end of said seat and said door; the improvement comprising a second safety belt section having a first extremity adapted for locking engagement with the free extremity of said first safety belt section, and a second extremity passing into the hollow space between said interior and exterior panels at an opening adjacent the junction of said interior panel, said connecting panel and the lower boundary of said window opening such that when said sections are locked together, they will pass around a person seated in said seat in generally diagonal fashion, a bar attached to the interior surface of said connecting panel, said second section being wrapped around said bar and stitched onto itself to fixedly secure said second extremity such that pulling forces on said second section will be at least partially transferred to the upright member of the vehicle frame.

2. The improved safety device as defined in claim 1 wherein said welded bar is positioned immediately below the window opening of said door.

PO-1050
(5/69)

UNITED STATES PATENT OFFICE
CERTIFICATE OF CORRECTION

Patent No. 3,603,615            Dated September 7, 1971

Inventor(s) John L. Stehouwer

It is certified that error appears in the above-identified patent and that said Letters Patent are hereby corrected as shown below:

Column 1, line 19;

"the" should be --- that ---;

Column 4, line 29;

"said welded bar" should be --- said bar ---.

Signed and sealed this 29th day of February 1972.

(SEAL)
Attest:

EDWARD M. FLETCHER, JR.           ROBERT GOTTSCHALK
Attesting Officer                   Commissioner of Patents